(12) United States Patent
Sernau et al.

(10) Patent No.: US 11,170,006 B2
(45) Date of Patent: Nov. 9, 2021

(54) MACHINE-LEARNING MODEL FOR RANKING DIVERSE CONTENT

(71) Applicant: Facebook, Inc., Menlo Park, CA (US)

(72) Inventors: Luke Sernau, Seattle, WA (US); Jonjo Twist, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 195 days.

(21) Appl. No.: 15/861,041

(22) Filed: Jan. 3, 2018

(65) Prior Publication Data

US 2019/0205402 A1 Jul. 4, 2019

(51) Int. Cl.
| | |
|---|---|
| *G06F 16/2457* | (2019.01) |
| *G06N 20/00* | (2019.01) |
| *G06F 16/28* | (2019.01) |
| *G06Q 50/00* | (2012.01) |

(52) U.S. Cl.
CPC .. *G06F 16/24578* (2019.01); *G06F 16/24575* (2019.01); *G06F 16/285* (2019.01); *G06N 20/00* (2019.01); *G06Q 50/01* (2013.01)

(58) Field of Classification Search
CPC ............. G06F 16/24578; G06F 16/285; G06F 16/24575; G06N 20/00; G06Q 50/01
See application file for complete search history.

(56) References Cited

U.S. PATENT DOCUMENTS

| | | | |
|---|---|---|---|
| 6,944,612 B2 * | 9/2005 | Roustant | G06F 16/9535 707/706 |
| 8,489,627 B1 * | 7/2013 | Brandt | G06F 16/9038 707/765 |
| 9,129,227 B1 | 9/2015 | Yee | |
| 2013/0031034 A1 * | 1/2013 | Gubin | G06Q 10/06393 706/12 |
| 2014/0279736 A1 | 9/2014 | Glass | |

(Continued)

FOREIGN PATENT DOCUMENTS

CN 106855876 A 6/2017

OTHER PUBLICATIONS

International Search Report and Written Opinion for International Application No. PCT/US2018/012292, dated Sep. 27, 2018.

(Continued)

*Primary Examiner* — Ashish Thomas
*Assistant Examiner* — Abdullah A Daud
(74) *Attorney, Agent, or Firm* — Baker Botts L.L.P.

(57) ABSTRACT

In one embodiment, a method includes a computing system accessing a content item associated with a content provider, the content item having a first set of attributes and a second set of attributes. The system may generate, using a first machine-learning model, a first ranking score of the content item for a user based on the first set of attributes. The system may generate cluster representations of the second set of attributes of the content item. The system may generate, using a second machine-learning model, a second ranking score of the content item for the user based on the cluster representations. The system may generate, using a third machine-learning model, a third ranking score of the content item for the user based on the first ranking score and the second ranking score. The system may select the content item for presentation to the user based on the third ranking score.

20 Claims, 6 Drawing Sheets

(56) References Cited

U.S. PATENT DOCUMENTS

| | | | | |
|---|---|---|---|---|
| 2014/0328486 | A1* | 11/2014 | Gopinath | H04R 3/00 381/56 |
| 2016/0034460 | A1 | 2/2016 | Ding | |
| 2016/0147865 | A1* | 5/2016 | Mashin-Chi | G16Z 99/00 707/737 |
| 2017/0161618 | A1* | 6/2017 | Swaminathan | G06Q 30/02 |
| 2017/0344633 | A1* | 11/2017 | Bose | G06F 16/358 |
| 2018/0181570 | A1* | 6/2018 | Chou | G06F 16/583 |
| 2018/0189292 | A1* | 7/2018 | Grace, Jr. | G06F 16/93 |
| 2018/0232702 | A1* | 8/2018 | Dialani | G06Q 50/01 |
| 2018/0239830 | A1* | 8/2018 | Dialani | G06Q 10/1053 |
| 2019/0087865 | A1* | 3/2019 | Loree | G06Q 50/01 |
| 2019/0205793 | A1* | 7/2019 | Balasubramanian | G06F 16/5854 |

OTHER PUBLICATIONS

EESR received from EPO for EP Patent Application No. 18898765. 5-1213, Oct. 8, 2020.

Pham, et al., A General Recommendation Model for Heterogeneous Networks, IEEE Transactions on Knowledge and Data Engineering, IEEE Service Center, Los Alamitos, CA, US, vol. 28(12):3140-3153, XP011633323, Dec. 1, 2016.

Yan, et al., A Unified Video Recommendation by Cross-Network User Modeling, ACM Transactions on Multimedia Computing Communications and Applications, vol. 12, No. 4, pp. 1-24, XP058277914, Aug. 3, 2016.

Yang, et al., A Graph-based Recommendation across Heterogeneous Domains, conference on information and knowledge Management, ACM, 2 Penn Plaza, Ste 701 NY, pp. 463-472, XP058076713, Oct. 17, 2015.

Min, et al., Cross-Platform Multi-Modal Topic Modeling for Personalized Inter-Platform Recommendation, IEEE Transactions on Multimedia, IEEE Service Center, US, vol. 17(10):1787-1801, XP011669339, Oct. 1, 2015.

International Preliminary Report on Patentability and Written Opinion for International Application No. PCT/US2018/012292, Jul. 16, 2020.

* cited by examiner

MACHINE-LEARNING MODEL FOR RANKING DIVERSE CONTENT

TECHNICAL FIELD

This disclosure generally relates to machine learning for ranking.

BACKGROUND

A social-networking system, which may include a social-networking website, may enable its users (such as persons or organizations) to interact with it and with each other through it. Increasingly, social-networking systems, as well as other types of Internet-based platforms (e.g., web sites, e-mail systems, servers of mobile-device applications, etc.), are being leveraged as content distributors. Different content providers may request the Internet-based platform to distribute the content providers' respective content to users of the platform. Certain content providers may provide multiple content items to the platform and request the platform to select the ones that would likely be of interest to the receiving users. The platform may use a ranking model to rank the candidate content items and select the ones that are most likely to be of interest to the user. Since different content providers may request the platform to distribute different types of content items under different circumstances, the platform may custom tailor different ranking models for different needs of the different content providers. However, developing custom ranking models in this manner suffers from scalability constraints, especially for ranking models that require sufficiently large data samples to develop.

SUMMARY OF PARTICULAR EMBODIMENTS

Particular embodiments described herein relate to a robust ranking system that allows diverse, unstructured content from different content providers to be ranked. The machine-learning models used in the ranking system may not necessarily be trained on training data that are homogeneous with respect to the input data at inference time. In particular embodiments, the ranking system may achieve this robustness by conceptually separating the data attributes of a content item provided by a content provider into (1) known attributes that can be mapped to a set of common attribute types that are recognized by a first ranking model and (2) custom attributes that cannot be mapped or are otherwise not recognized by that first ranking model. In particular embodiments, the known attributes may be consumed by the first ranking model to generate a ranking score for the content item. In particular embodiments, the custom attributes may be grouped based on a clustering model so that similar attributes from different content providers may be treated as being equivalent. A second ranking model may be trained to consume the clustered custom attribute data. Since the second ranking model is trained to recognize the generalized cluster information, the ranking system would not need custom ranking models for different content providers or types of content items. In particular embodiments, a third ranking model may then take as input the ranking results from the first ranking model and the second ranking model to generate a ranking score for the content item.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments described herein relate to a robust ranking system that allows diverse, unstructured content from different content providers to be ranked. The machine-learning models used in the ranking system may not necessarily be trained on training data that are homogeneous with respect to the input data at inference time. In particular embodiments, the ranking system may achieve this robustness by conceptually separating the data attributes of a content item provided by a content provider into (1) known attributes that can be mapped to a set of common attribute types that are recognized by a first ranking model and (2) custom attributes that cannot be mapped or are otherwise not recognized by that first ranking model. In particular embodiments, the known attributes may be consumed by the first ranking model to generate a ranking score for the content item. In particular embodiments, the custom attributes may be grouped based on a clustering model so that similar attributes from different content providers may be treated as being equivalent. A second ranking model may be trained to consume the clustered custom attribute data. Since the second ranking model is trained to recognize the generalized cluster information, the ranking system would not need custom ranking models for different content providers or types of content items. In particular embodiments, a third ranking model may then take as input the ranking results from the first ranking model and the second ranking model to generate a ranking score for the content item.

Figure 1:
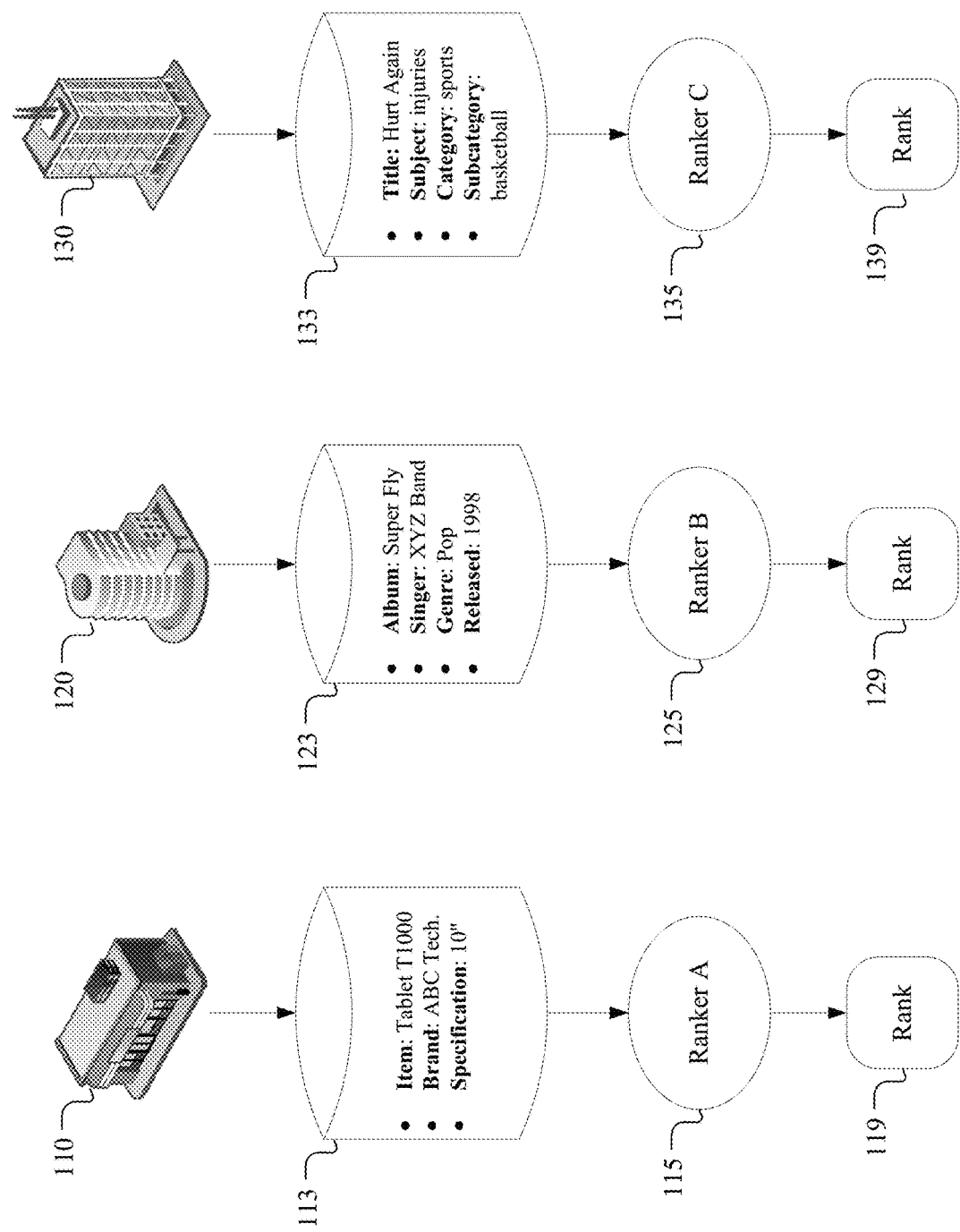
FIG. 1 illustrates an example of heterogeneous content providers and content items.

A ranking system may need to be sufficiently robust to handle content from a variety of sources. FIG. 1 illustrates an example of heterogeneous content providers and content items. Three different types of content providers are illustrated: an electronics store 110, an online music distributor 120, and a news provider 130. The different types of content providers may request the ranking system to rank different types of content. For example, the electronic store 110 may wish to rank its products, the online music distributor 120 may wish to rank its albums, and the news provider may wish to rank its news articles. Other types of content providers may also ask the system to rank any other type of content, including photos, audio, video, streamed content, personal profiles, comments, goods and services, or any other types of content. In addition, some content providers may have esoteric content types that are highly specific to them (e.g., choosing which version of their homepage to show each user based on ranking score). Each content type may have unique attributes. For example, the electronics store 110 may have a product content type 113 that includes the following attribute types for describing each product: item name, brand, and specification. The online music distributor 120 may have an album content type 123 that includes the following attribute types for describing each album: album name, singer, genre, and release date. The news provider 130 may have a news content type 133 that includes the following attribute types for describing each news item: title, subject, category, and subcategory. From the examples shown, it should be apparent that the attributes of different content types, especially those of different content providers, may be very different. While differences exist, one should also note that some attributes may be conceptually similar. For example, the item name of the products content type 113, the album name of the album content type 123, and the title of the news content type 133 may all be considered as labels for their respective content types.

In addition to differences between content types, different content providers may have different content-ranking objectives and may wish the ranking system to consider other types of context information. An example of different content-ranking objectives or outcome include optimizing for user clicks (e.g., a user clicking on an article to see the full article on the content provider's website), user comments/engagement (e.g., a user commenting on, sharing, or "liking" the content item presented through a social-networking platform), user installs (e.g., a user agreeing to install a software application associated with the presented content item), user downloads (e.g., a user downloading or streaming a song or video), user re-blogs (e.g., a user re-posting or re-distributing the content item), user purchases, etc. Different content providers may also wish to target different types of demographics. For example, the online music distributor 120 may wish to target teens for its pop songs, and the news provider 130 may wish to target industry professionals for its financial news. Additionally, different content providers may wish the ranking system to consider different types of context information that may influence a particular ranking. This may include, for example, recent or current activities of the user for whom the content item is being targeted. For instance, the electronics store 110 may want the ranking system to consider the items that are currently in the target user's cart, the online music distributor 120 may want the ranking system to consider the typical songs that the target user listens to, and the news provider 130 may want the ranking system to consider the types of news articles that the target user read yesterday.

To accommodate the needs of different content providers, particular embodiments may build custom rankers for each content provider. This is illustrated in FIG. 1 by Ranker A 115, Ranker B 125, and Ranker C 135 being used for ranking the product content type 113, album content type 123, and the news content type 133, respectively. Each of Ranker A 115, Ranker B 125, and Ranker C 135 may process their respective input data to output rank 119, rank 129, and rank 139, respectively.

However, given the potentially endless differences in content types and/or other information that content providers may ask the ranking system to process, building a custom ranking model for each content provider and/or each content type may be costly, time-consuming, and not scalable. Further, a new content provider may not have sufficiently rich data to adequately train its custom model, at least in the beginning, and therefore the effectiveness and efficiency of the model may not be optimal until sufficient data has been gathered (this may be referred to as the "cold-start problem"). An alternative may be to build a single ranking model using the available data from different content providers, but doing so may require certain generalizations to be made (e.g., not considering certain more esoteric, but potentially highly predictive/relevant, attributes). The single model may also be over-fitted to common content types and under-fitted for relatively more rare content types. Furthermore, since the single model is trained on existing data, it may not be sufficiently calibrated to process a new content type from a new content provider.

To address the aforementioned issues, particular embodiments provide a ranking system that allows diverse, unstructured content from different content providers to be ranked using machine-learning models. In particular embodiments, the machine-learning models may be trained on any available data associated with any content providers, even if the content providers and/or their respective content types differ. Once trained, the machine-learning models may be used to process and rank any content type, even if that content type is different from any of the content types used in training. Stated differently, the machine-learning models may be trained on existing data that may or may not reflect the input data that is to be ranked at inference time. For example, the machine-learning models may be trained using existing training data, such as content items of an electronics store, but the training machine-learning models may be used to rank different types of content items, such as those of a music distributor. This deviates from conventional configurations where a machine-learning model is trained on data with the same attributes types as the data that the model is trained to process at inference time. Thus, one benefit of the ranking system is that once it has been trained, it may be used to rank even new content types and provide reasonable ranking quality from the start. So even if the new content type lacks sufficient training data to train a custom ranking model, the new content type may be ranked using the ranking system that was trained on other, existing content types.

Figure 2:
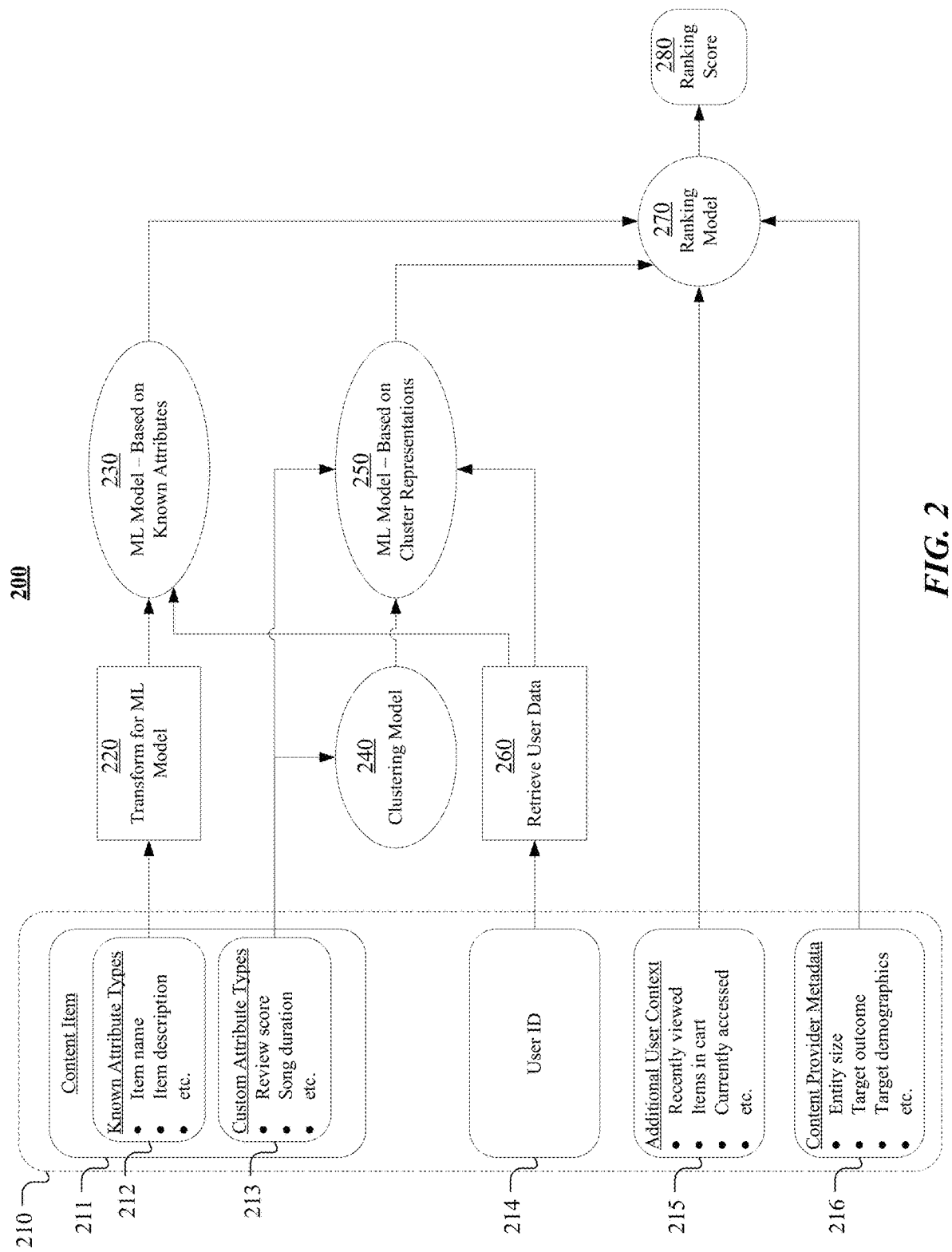
FIG. 2 illustrates a ranking system architecture in accordance with particular embodiments.

FIG. 2 illustrates a robust ranking system 200 in accordance with particular embodiments. The ranking system 200 may be configured to rank content for particular users or content consumers. Particularly in situations where there is a large volume of content (e.g., a catalogue of items, songs, or news articles), an objective of the ranking system may be to rank and prioritize content for specific viewers. By providing targeted content that is relevant or of interest to its viewer, the ranking system helps content providers reach their audience in an efficient and effective manner. Additionally, the platform helps focus content for viewers, thereby preventing information overload or fatigue.

In particular embodiments, a content provider may request the ranking system 200 to rank and distribute its content. The content provider may provide the ranking system 200 with a variety of information 210 that may be used for ranking content items 211. As an example, a content provider (e.g., music distributor) may request the ranking system 200 to rank one or more content items 211 (e.g., songs) for individual users (e.g., to provide each user with personalized song recommendations). In particular embodiments, each content item 211 provided by the content provider may have a variety of attributes. Some of the attributes may be of known attribute types 212 and others may be of custom attribute types 213, which may be different from the known attribute types 212. The known attribute types 212 may be attribute types that were used in the training of the machine-learning model 230. For example, if the machine-learning model 230 was trained on data that have the attribute, Item Description, the content item's 212 Item Description attribute may be considered as a known attribute. In particular embodiments, the ranking system 200 may be configured to recognize that certain attributes of the content item 211 are equivalent to a known attribute that is recognized by the machine-learning model 230. For example, the ranking system 200 may recognize that the Item Name attribute type of the content item 211 can be mapped to the Item Label attribute type that was used in the training of the machine-learning model 230. In particular embodiments, the attributes of the content item 211 may be provided in a structured format (e.g., XML, JSON, etc.) with information that may be used to transform or map the structured attributes into a format recognized by the machine-learning model 230.

In particular embodiments, the content item 211 may also include attributes that may be referred to as custom attribute types 213. Custom attribute types 213, as used herein, refers to attribute types that were not used in the training of the machine-learning model 230. In other words, custom attribute types 213 are different from the attribute types of the training data used for training the machine-learning model 230. As previously described, content items from different providers may have unique, custom attributes. For instance, if the content item 211 is a song, it may have custom attributes that indicate the song's review score on the content provider's platform (e.g., 4 stars out of a maximum of five stars) and the song's duration. These types of attributes may be unique to the particular content provider or content type. For instance, an electronic product content item or a news content item may not have a song duration attribute, since such an attribute may not make sense in the context of the content item. Since custom attribute types 213 may not be recognized by the machine-learning model 230, the ranking system 200 may process them differently, as will be described in further detail below.

In particular embodiments, the ranking system 200 may be asked to rank content items for a particular user, as represented by a user ID 214. In particular embodiments, the content provider may generally request that its content items be distributed to users in a personalized fashion (e.g., selectively surface content items that are likely to be of interest to each individual user). Based on such a request, the social-networking platform (or other types of content-distribution platform) may identify the particular users to whom to surface the content items. For example, if the content provider specified a particular user demographic of interest, the social-networking platform may select users accordingly. As another example, when a user requests content (e.g., a newsfeed) from the social-networking platform, the platform may identify the requesting user as a potential candidate for receiving the content items of the content provider. In both of these examples, the content provider does not specify the specific user to whom to distribute content items. Rather, it is the social-networking or content-distribution platform that is identifying the target candidate user. In particular embodiments, the content provider may specify the specific user to whom to distribute content items. For example, a particular user may be browsing songs on the content provider's system, and the content provider may wish to leverage the vast data and ranking system 200 of the social-networking platform to predict which songs are likely to be of interest to that user. In particular embodiments, the content provider may send a request (e.g., via an API call) to the social-networking platform, asking content items (e.g., songs) to be ranked for that particular user. In this scenario, the content provider may specify the specific user to whom the content items are directed.

In particular embodiments, the ranking system 200 may further take into consideration context information surrounding a particular ranking request or the context in which content item is to be displayed. For example, in embodiments where the ranking of a content item is personalized for a particular user, the content provider may also provide user context information 215 pertaining to the current context in which the content item is to be displayed. For example, the content provider may provide information such as the types of content that the viewer is currently consuming or has recently consumed (e.g., types of songs the user recently listened to, news articles that the user is currently reading, software applications that has been downloaded, etc.), the items that are currently in the user's cart, search terms used by the user within a predetermined time window, and any other type of user information or user activity data that may be relevant for predicting the user's interest in the content items. The social-networking platform or content-distribution platform that is being asked to perform the ranking may also retrieve, from the platform's knowledge base, user information or activity data that may be used to assess the current state of mind or interest of the user. For example, a social-networking platform may identify posts, newsfeeds, or videos that the user recently viewed or engaged with (e.g., by commenting, "liking," sharing, etc.). Such user context information may be used by the ranking system 200 to predict which of the content items 211 would likely be of interest to the user, as will be described in further detail below.

To improve ranking effectiveness, the content provider may, in particular embodiments, provide certain metadata 216 about itself as well, such as its company size, industry, geographic location, and any other suitable information that may help the content provider reach its intended audience. Furthermore, as previously described, different content providers may have different ranking objectives to achieve certain desired outcomes. For example, some content providers may wish to optimize the ranking results for clicks, while others may wish to optimize ranking for social-networking engagements (e.g., comments, shares, etc.), downloads, etc. Content providers may also know the desired or preferred user demographics. Thus, in particular embodiments, the ranking system may also take into consideration the content provider's metadata 316 that indicate the content provider's preferred ranking objectives, outcomes, demographics, etc.

In particular embodiments, the aforementioned data (e.g., known attributes and custom attributes of the content items, user data, and content provider data) may be processed by different machine-learning models. With respect to the known attributes of the content items, the ranking system 200 may use a machine-learning model 230 to rank the content items based on their respective attributes that are known by the machine-learning model 230. In particular embodiments, the machine-learning model 230 may be trained using a training dataset that has a set of known attribute types. In particular embodiments, the machine-learning model 230 may be an existing machine-learning model of the social-networking platform, trained to rank content items based on a set of rich, existing training data with predetermined attributes. The training data may include content items from a variety of content providers, and the training content items may or may not reflect the type of content items that the current content provider is asking the system 200 to rank. For example, the existing machine-learning model may have been trained using data from a wholesaler or electronics store, while the current content provider may be a music or news distributor. However, since the current content item may have attributes in common with those used for training the machine-learning model 230, the model 230 may nevertheless be used to rank the content items based on such attributes (albeit based on incomplete data, since the content items may have custom attribute types 213). In particular embodiments, each training sample in the training data set may include (1) a training content item with attributes of the known types, (2) user data associated with a user to whom the training content item was presented, and (3) a ranking metric (e.g., whether the user clicked or downloaded the content item) that represents how the training content item should be ranked (e.g., this may be considered as the ground truth or label of the training sample). In particular embodiments, the machine-learning model 230 may be a neural network, but any other suitable types of machine-learning models may also be used.

In particular embodiments, the ranking system 200 may use the trained machine-learning model 230 to generate a preliminary rank for a given content item 211 based on its known attributes 212. In particular embodiments, the content provider may provide structured data that may be used to determine how the known attributes 212 should be interpreted. For example, the content item may be a JSON blob with structured attributes (e.g., name, description, price, timestamp, etc.) that may be mapped to attributes known or recognized by the machine-learning model 230. Thus, in particular embodiments, the ranking system 200 may transform 220 the structured attributes of the known attribute types 212 into a format or data structure expected by the machine-learning model 230 (which may be trained to handle null attributes). In particular embodiments, the transformed set of attributes of the known attribute type 212 may be input into the machine-learning model 230. In particular embodiments, the machine-learning model 230 may also take as input user data associated with the user for whom the content item is being ranked. In particular embodiments, the user data may be retrieved 260 from the social-networking/content-distribution platform and/or the content provider. Based on the input data, the machine-learning model 230 may generate a ranking score for the corresponding content item 211 (e.g., the ranking score may represent a relative relevance of the content item to the particular user). The ranking score from the machine-learning model 230 may then be input into a final ranking model 270, which will be described below.

In particular embodiments, the ranking system 200 may use a different machine-learning model 250 to process the custom attribute types 213 of the content item 211. As described elsewhere herein, the content items provided by the current content provider may have data attributes that do not neatly map to any of the predetermined features recognized by the machine-learning model 230 configured for known attributes. Yet, these custom data attributes may nevertheless be relevant to how the content item should be ranked to optimize some desired metric. One way for the ranking system 200 to take into consideration the custom attribute types 213 is to train a machine-learning model based on the custom attributes directly. However, this approach may result in the system 200 needing different machine-learning models for different types of content items. Thus, in particular embodiments, the ranking system 200 may instead generalize the custom attribute types 213 and train a machine-learning model 250 based on the generalized data.

In particular embodiments, the ranking system may use a clustering model 240 to cluster the custom attributes of each content item in the training data based on their respective similarities to other attributes across the whole ecosystem (e.g., across the social-networking platform or content-distribution platform). In particular embodiments, similar attributes may be clustered closer together in the clustering space of n dimensions. In particular embodiments, for each custom attribute, the clustering model 240 may generate a corresponding cluster ID or vector representation of that attribute in the cluster space. In particular embodiments, the cluster representations output by the clustering model 240, along with the attributes of the custom type 213, may be used to train a machine-learning model 250 to rank content items based on their respective cluster representations and the associated custom data attributes. In addition, the machine-learning model 250 may also take as input user data associated with the user for whom the content item was presented. In particular embodiments, each training sample in the training data set may include (1) a training content item (which may correspond to the training content items used for training the first machine-learning model 230) with attributes of the custom types, (2) user data associated with a user to whom the training content item was presented, and (3) a ranking metric (e.g., whether the user clicked or downloaded the content item) that represents how the training content item should be ranked (e.g., this may be considered as the ground truth or label of the raining sample). In particular embodiments, the machine-learning model 250 may be a neural network, but any other suitable types of machine-learning models may also be used.

In particular embodiments, the ranking system 200, in operation or at inference time, may use the trained machine-learning model 250 to generate a second preliminary rank for a given content item 211 based on its custom attributes 213. In particular embodiments, attributes of the content item 211 that are of the custom types 213 may be processed by a clustering model 240. Then, those custom attributes and/or their respective cluster representations generated by the clustering model 240 may be input into the trained machine-learning model 250. In particular embodiments where the machine-learning model 250 further considers user data, the system 200 may retrieve 260 the user data (e.g., based on the user ID 214) from the social-networking/content-distribution platform and/or the content provider. Based on these input data, the machine-learning model 250 may generate a ranking score for the corresponding content item 211 (e.g., the ranking score may represent a relative relevance of the content item to the particular user). The ranking score from the machine-learning model 250 may then be input into a final ranking model 270, which will be described below In particular embodiments, the ranking system 200 may use a third machine-learning ranking model 270 that is trained to output a ranking score based on the outputs of the machine-learning model 230 for known attributes and the machine-learning model 250 for custom attributes. The third ranking model 270 may be configured to take as input the outputs of model 230 and model 250. Conceptually, the ranking model 270 is trained to predict a ranking score based on (1) the ranking score generated based on known attributes and (2) the ranking score generated based on custom attributes). In particular embodiments, the third ranking model 270 may take into consideration information about content providers (e.g., characteristics such as size, industry type, etc.) and their ranking objectives (e.g., optimizing engagement or time spent, target demographics, etc.). Additionally or alternatively, the third ranking model 270 may also take into account context information about users 215 (e.g., recently viewed items, etc.). Thus, in particular embodiments, each training sample in the training dataset used for training the ranking model 270 may further include (1) contextual or activity information 215 associated with the user to whom the training content item of the training sample was presented, and/or (2) metadata relating to the content provider 216 of the training content item of the training sample. As with the other aforementioned machine-learning models (e.g., the machine-learning model 230 for known attributes, the clustering model 240, the machine-learning model 250 for cluster representations), the ranking model 270 may be trained using data associated with content providers different from the content provider who is at inference time requesting the system to rank its content items. At inference time, the ranking model 270 may, therefore, take into all the aforementioned considerations when making a determination as to how a given content item 211 should be ranked given a particular user 214. In particular embodiments, the ranking model 270 may output a value (e.g., between 0 and 1) that represents how likely the user 214 would behave in the desired manner in response to being presented with the content item 211.

To further fine-tune ranking results, small models customized for each content provider may be trained based on the available data (even if limited). For example, a personalized machine-learning model may be trained for a particular content provider using both the known attribute types 212 and the custom attribute types 213 of the content provider's content items 211. Since the amount of training data may be limited (which may be deliberately limited to minimize training time or simply due to limited availability), the accuracy of the personalized model may be insufficient. However, while the ranking outcome of such custom-tailored model may not have the benefit of being trained on the rich, global data of the social-networking/content-distribution platform, it may nevertheless provide some benefit in determining ranking. As such, in particular embodiments, the ranking model 270 may further be trained to take into consideration the ranking outputs of personalized models.

Figure 3:
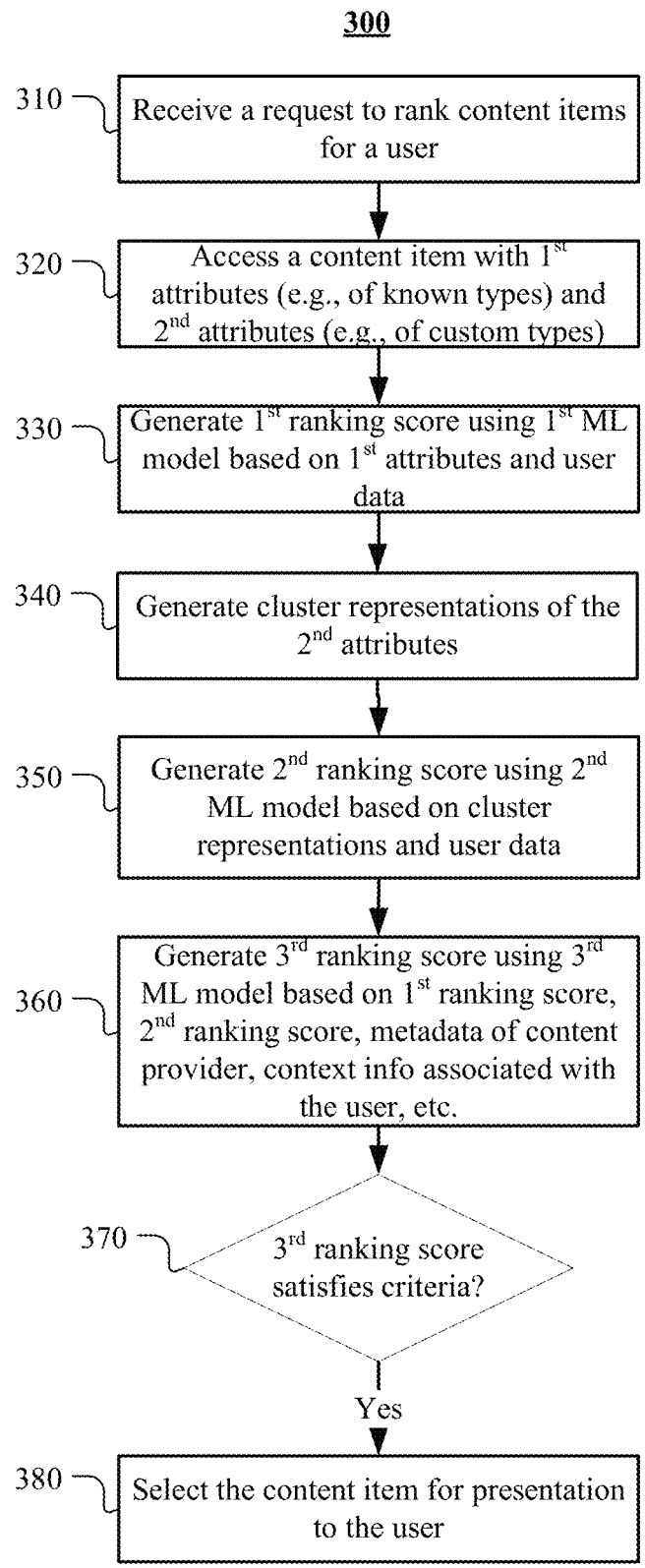
FIG. 3 illustrates an example method for ranking a content item using the ranking system.

FIG. 3 illustrates an example method 300 for ranking a content item using the ranking system. The method may begin at step 310, where a computing system associated with the ranking system may receive a request to rank content items for users. The computing system may receive the request directly from a content provider of the content items (e.g., via an API call). The computing system may also indirectly receive the request from the content provider via other handlers of the system. For example, the content provider may have issued a general request to distribute content items to users when they log into the system. Thus, whenever a user meeting the desired characteristics (e.g., demographics, interests, etc.), the system may automatically invoke the ranking system to determine which of the content items would be ranked highly with respect to that user.

At step 320, the computing system may access a content item associated with the requesting content provider. For example, the content item may be stored in a database or dynamically received and stored at least temporarily in RAM. In particular embodiments, the content item may have a first set of attributes (e.g., of known attribute types) and a second set of attributes (e.g., of custom attribute types). For example, if the content item is a song, the first set of attributes may include a song title/label and description, and the second set of attributes may include song duration. In particular embodiments, data associated with the content item may be structured (e.g., in JSON or XML format), and based on the structured information, the system may identify the attributes with known attribute types. Attributes that are not or cannot be mapped to the known attribute types may be deemed custom attributes.

At step 330, the computing system may generate, using a first machine-learning model that is trained/configured to process attributes of the known type, a first ranking score of the content item for a user based on the first set of attributes. In particular embodiments, the system may map or transform the first set of attributes of the known type into a format that the first machine-learning model was trained to process. As an example, certain attributes may have a one-to-one mapping with a known attribute type (e.g., a song title may have a one-to-one mapping with an item label). Other attributes of the content item may be transformed to conform to the known attribute type (e.g., a content item having a separate "depth," "height," and "width" attributes may be transformed to form a single known "dimension" attribute, which may have the format: height×width×depth). In particular embodiments, the first machine-learning model may process the known attributes of the content item, without considering data associated with any particular user, and output a ranking score. The ranking score may represent the likely relative desirability of the content item relative to other content items. In particular embodiments, the first machine-learning model may also take as input user data associated with a particular user for whom the content item is being ranked. In such a case, the system may retrieve the user data from the content provider, the social-networking/content-distribution platform, or any other suitable source where such data is available. After processing the content item's known attributes and the user data, the first machine-learning model may output a ranking score. The ranking score may represent, for example, a likely suitability of the content item for that particular user. The ranking score generated by the first machine-learning model may be considered as preliminary since the first machine-learning model did not consider the custom attributes of the content item.

At step 340, the system may generate cluster representations of the second set of attributes (custom attributes) of the content item. As described elsewhere herein, particular embodiments may use a clustering model trained to generalize custom attributes so that attributes placed in the same cluster would be more similar to each other than to those in other clusters. In particular embodiments, the clustering model may implement any suitable clustering algorithms (e.g., k-means, hierarchical clustering, etc.) to perform the task of clustering. The output of the clustering model may be cluster representations of the input custom attributes.

At step 350, the system may generate, using a second machine-learning model, a second ranking score of the content item for the user based on the cluster representations. In particular embodiments, the second machine-learning model may have been trained on cluster representations of a variety of custom attributes of different types of training content items. As such, the second machine-learning model has learned how to process the cluster representations of the content item and infer the appropriate ranking score therefrom. In particular embodiments, the second machine-learning model may have further been trained to take into consideration a user's data when determining the appropriate ranking score for that user. In this case, the second machine-learning model may further take as input the user data of the user for whom the ranking is being generated. The ranking score output by the second machine-learning model may represent, for example, a likely suitability of the content item for that particular user. Similar to the ranking score generated by the first machine-learning model, the ranking score from the second machine-learning model may be considered to be preliminary, since the second machine-learning model may not take into consideration the known attributes of the content item.

At step 360, the system may generate, using a third machine-learning model, a third ranking score of the content item for the user based on the first ranking score and the second ranking score from the first machine-learning model and the second machine-learning model, respectively. Conceptually, the third machine-learning model is one layer of abstraction removed from the underlying attributes of the content item. Rather than processing the attributes of the content item directly, it may do so indirectly through the outputs of the first and second machine-learning models. In particular embodiments the third machine-learning model may also consider predetermined types of metadata associated with the content provider of the content item since the characteristics of the content provider may be predictive of the user's level of interest in the content item. For example, a particular user may only be interested in sports news from a news source that handles sports news exclusively and not from a more generic news source that, in addition to sports, reports on financial news, foreign news, domestic news, etc. Examples of the content provider's metadata may include the size and industry of the content provider, target outcomes (e.g., ranking objectives) for presenting the content item to the user, target demographics of the user, and/or any other suitable information. In particular embodiments, the third machine-learning model may additionally or alternatively take as input context information associated with the particular user for whom the ranking is being generated. In particular embodiments, the context information may provide the third machine-learning model with a sense of the context in which the content item may be presented. For example, if the content provider wishes to determine which content item to present to a particular user in the near future, context information that may reflect the user's current or recent state of mind or interest may be predictive of which content item would more likely to be of interest to the user. Thus, in particular embodiments, the third machine-learning model may further take as input predetermined types of context information associated with the user in generating the ranking score. The ranking score generated by the third machine-learning model may be considered as the final ranking score for the content item.

At step 370, the system may determine whether the ranking score generated by the third machine-learning model satisfies one or more predetermined criteria. For example, the system may compare the ranking score of the content item with the ranking scores of other content items, respectively, to determine which of the content items have the highest-ranking scores. As another example, the system may determine whether the ranking score generated by the third machine-learning model is above a certain predetermined threshold value. If any of the content items satisfy the one or more criteria, the system may proceed, at step 380, to select the content item for presentation to the user based on the third ranking score. This may include, for example, surfacing information associated with the content item (e.g., a banner display, video, audio, or any other perceptible information relating to the content item) to the user through the social-networking platform or content distribution platform. The system may also push notifications (e.g., via e-mail, SMS text, in-app notifications, etc.) relating to the content item to the user's device. The system may also inform the content provider of the ranking results (e.g., the IDs of the content items that satisfied the threshold criteria) and let the content provider decide how to use the information. The content provider may similarly display banners and/or other forms of perceptible messages to the user via its own platform.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for ranking a content item using the ranking system, including the particular steps of the method of FIG. 3, this disclosure contemplates any suitable method for ranking a content item using the ranking system, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
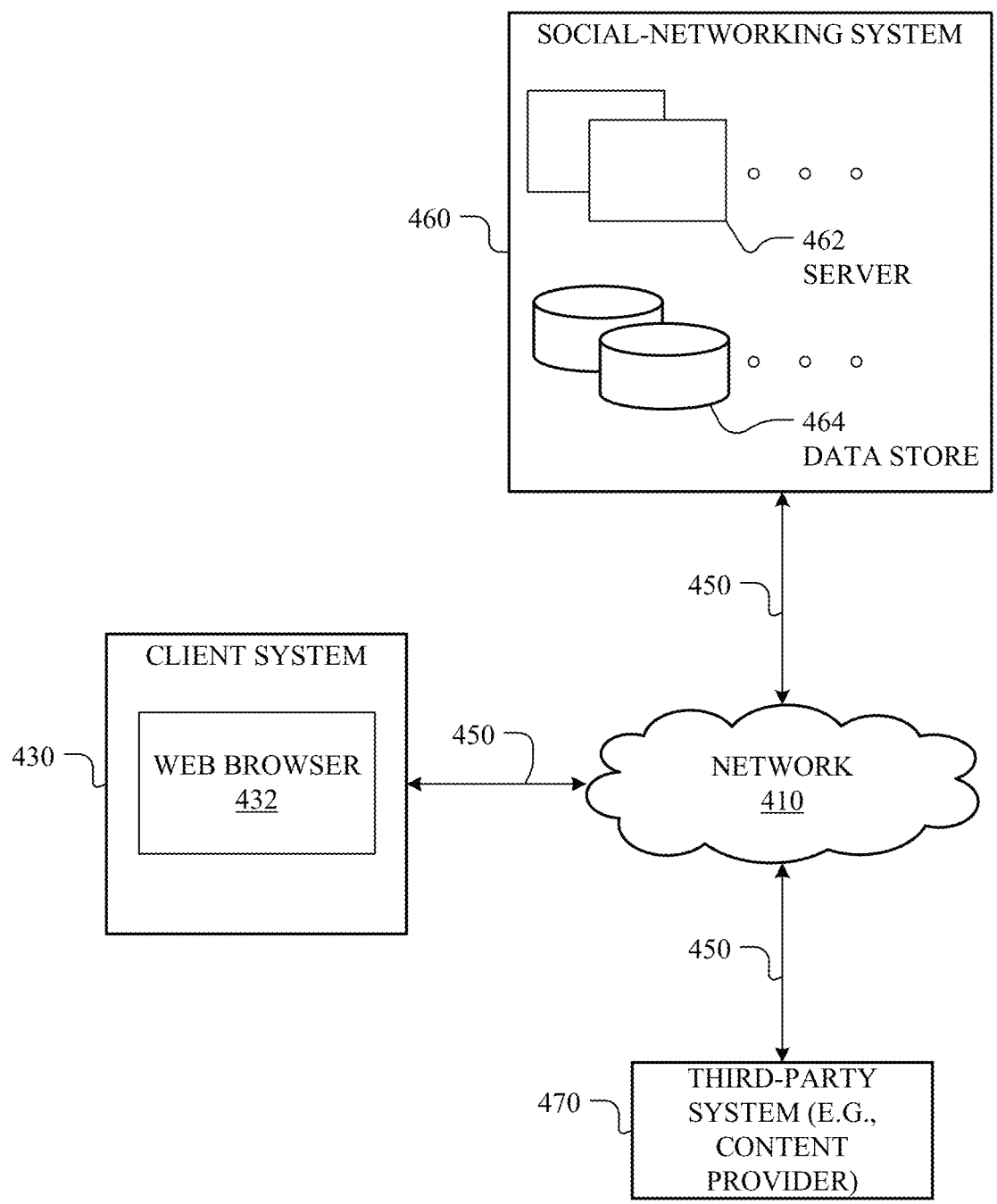
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client systems 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
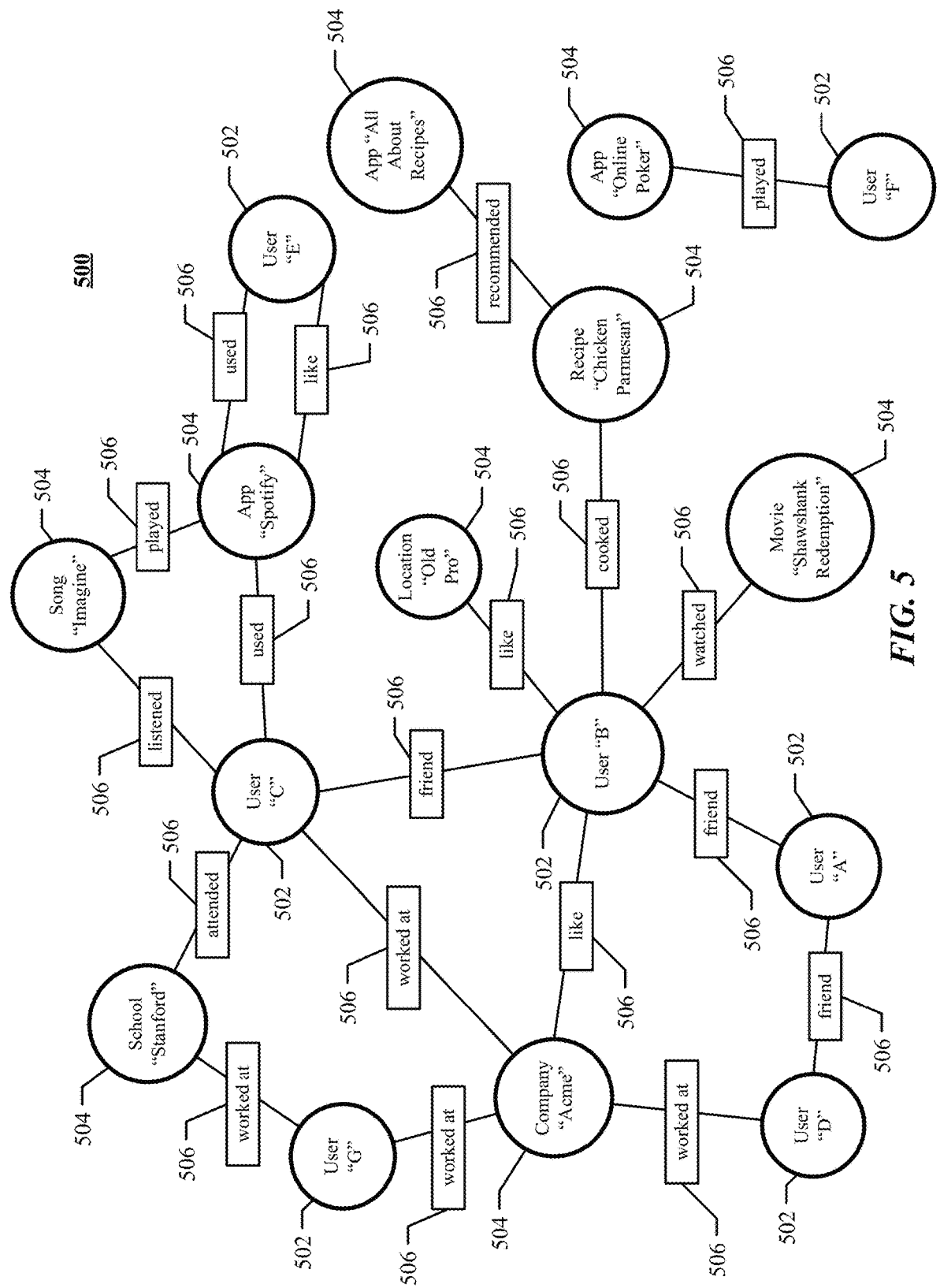
FIG. 5 illustrates an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party system 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 430 to send to social-networking system 460 a message indicating the user's action. In response to the message, social-networking system 460 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 464. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506. The degree of separation between two objects represented by two nodes, respectively, is a count of edges in a shortest path connecting the two nodes in the social graph 500. As an example and not by way of limitation, in the social graph 500, the user node 502 of user "C" is connected to the user node 502 of user "A" via multiple paths including, for example, a first path directly passing through the user node 502 of user "B," a second path passing through the concept node 504 of company "Acme" and the user node 502 of user "D," and a third path passing through the user nodes 502 and concept nodes 504 representing school "Stanford," user "G," company "Acme," and user "D." User "C" and user "A" have a degree of separation of two because the shortest path connecting their corresponding nodes (i.e., the first path) includes two edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

In particular embodiments, social-networking system 460 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 470 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 460 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 460 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 460 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 460 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 460 may calculate a coefficient based on a user's actions. Social-networking system 460 may monitor such actions on the online social network, on a third-party system 470, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 460 may calculate a coefficient based on the user's actions with particular types of content. The content may be associated with the online social network, a third-party system 470, or another suitable system. The content may include users, profile pages, posts, news stories, headlines, instant messages, chat room conversations, emails, advertisements, pictures, video, music, other suitable objects, or any combination thereof. Social-networking system 460 may analyze a user's actions to determine whether one or more of the actions indicate an affinity for subject matter, content, other users, and so forth. As an example and not by way of limitation, if a user frequently posts content related to "coffee" or variants thereof, social-networking system 460 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 460 may calculate a coefficient based on the type of relationship between particular objects. Referencing the social graph 500, social-networking system 460 may analyze the number and/or type of edges 506 connecting particular user nodes 502 and concept nodes 504 when calculating a coefficient. As an example and not by way of limitation, user nodes 502 that are connected by a spouse-type edge (representing that the two users are married) may be assigned a higher coefficient than a user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 460 may determine that the user has a higher coefficient with respect to the first photo than the second photo because having a tagged-in-type relationship with content may be assigned a higher weight and/or rating than having a like-type relationship with content. In particular embodiments, social-networking system 460 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 460 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 500. As an example and not by way of limitation, social-graph entities that are closer in the social graph 500 (i.e., fewer degrees of separation) may have a higher coefficient than entities that are further apart in the social graph 500.

In particular embodiments, social-networking system 460 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 430 of the user). A first user may be more interested in other users or concepts that are closer to the first user. As an example and not by way of limitation, if a user is one mile from an airport and two miles from a gas station, social-networking system 460 may determine that the user has a higher coefficient for the airport than the gas station based on the proximity of the airport to the user.

In particular embodiments, social-networking system 460 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 460 may provide information that is relevant to user's interests and current circumstances, increasing the likelihood that they will find such information of interest. In particular embodiments, social-networking system 460 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 460 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 460 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 470 (e.g., via an API or other communication channel), or from another suitable system. In response to the request, social-networking system 460 may calculate the coefficient (or access the coefficient information if it has previously been calculated and stored). In particular embodiments, social-networking system 460 may measure an affinity with respect to a particular process. Different processes (both internal and external to the online social network) may request a coefficient for a particular object or set of objects. Social-networking system 460 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 6:
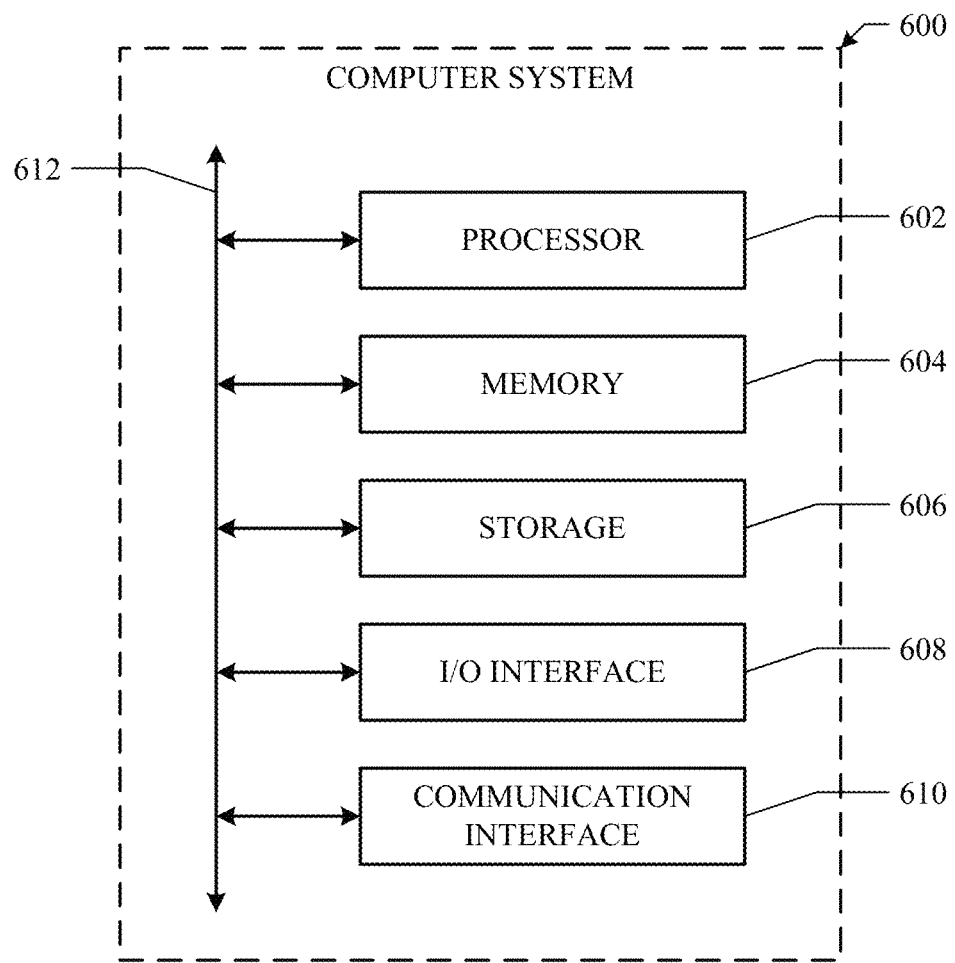
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packetbased communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   accessing a content item associated with a content provider, the content item having a plurality of attribute values corresponding to a plurality of attribute types;
   accessing a first machine-learning model trained to process attribute values of known attribute types;
   identifying that (1) a first set of attribute values in the plurality of attribute values corresponds to the known attribute types and (2) a second set of attribute values in the plurality of attribute values corresponds to custom attribute types different from the known attribute types, wherein the first machine-learning model is not trained to process attribute values of the custom attribute types, and wherein the second set of attribute values corresponding to the custom attribute types that are different from the known attribute types are to be clustered using a clustering model and resulting cluster representations are to be processed using a second machine-learning model;
   generating, using the first machine-learning model, a first ranking score of the content item for a user based on the first set of attribute values;
   clustering the second set of attribute values into a plurality of clusters using the clustering model, wherein the clustering model is configured to cluster attribute values based on similarities between the attribute values of the custom attribute types different from the known attribute types;
   generating cluster representations of the second set of attribute values of the content item based on the plurality of clusters;
   generating, using the second machine-learning model, a second ranking score of the content item for the user based on the cluster representations;
   generating, using a third machine-learning model, a third ranking score of the content item for the user based on the first ranking score from the first machine-learning model and the second ranking score from the second machine-learning model; and
selecting the content item for presentation to the user based on the third ranking score.

2. The method of claim 1, wherein the generating of the third ranking score is further based on metadata associated with the content provider.

3. The method of claim 2, wherein the metadata associated with the content provider comprises at least one of: a size of the content provider, a target outcome for presenting the content item to the user, or a target demographic of the user.

4. The method of claim 1, further comprising:
receiving, from the content provider associated with the content item, a request to rank the content item for the user; and
receiving, from the content provider, context information associated the user;
wherein the generating of the third ranking score is further based on the context information associated with the user.

5. The method of claim 1, further comprising:
accessing user data associated with the user;
wherein the generating of the first ranking score or the generating of the second ranking score is further based on the user data associated with the user.

6. The method of claim 1, wherein the first machine-learning model, the second machine-learning model, or the third-machine learning model is trained using data associated with at least a second content provider, the second content provider being different from the content provider.

7. The method of claim 1,
wherein the first set of attribute values have one or more known attribute types;
wherein the first machine-learning model is trained based on training data having the one or more known attribute types.

8. The method of claim 7,
wherein the second set of attribute values have one or more custom attribute types;
wherein the one or more custom attribute types are different from the known attribute types of the training data used for training the first machine-learning model.

9. The method of claim 1, further comprising:
generating, using a fourth machine-learning model, a fourth ranking score of the content item for the user based on the first set of attribute values and the second set of attribute values of the content item;
wherein the generating of the third ranking score of the content items is further based on the fourth ranking score.

10. The method of claim 9, wherein the fourth machine-learning model is trained using training data associated with the content provider.

11. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
accessing a content item associated with a content provider, the content item having a plurality of attribute values corresponding to a plurality of attribute types;
accessing a first machine-learning model trained to process attribute values of known attribute types;

identifying that (1) a first set of attribute values in the plurality of attribute values corresponds to the known attribute types and (2) a second set of attribute values in the plurality of attribute values corresponds to custom attribute types different from the known attribute types, wherein the first machine-learning model is not trained to process attribute values of the custom attribute types, and wherein the second set of attribute values corresponding to the custom attribute types that are different from the known attribute types are to be clustered using a clustering model and resulting cluster representations are to be processed using a second machine-learning model;
generating, using the first machine-learning model, a first ranking score of the content item for a user based on the first set of attribute values;
clustering the second set of attribute values into a plurality of clusters using the clustering model, wherein the clustering model is configured to cluster attribute values based on similarities between the attribute values of the custom attribute types different from the known attribute types;
generating cluster representations of the second set of attribute values of the content item based on the plurality of clusters;
generating, using the second machine-learning model, a second ranking score of the content item for the user based on the cluster representations;
generating, using a third machine-learning model, a third ranking score of the content item for the user based on the first ranking score from the first machine-learning model and the second ranking score from the second machine-learning model; and
selecting the content item for presentation to the user based on the third ranking score.

12. The system of claim 11, wherein the generating of the third ranking score is further based on metadata associated with the content provider.

13. The system of claim 12, wherein the metadata associated with the content provider comprises at least one of: a size of the content provider, a target outcome for presenting the content item to the user, or a target demographic of the user.

14. The system of claim 11, wherein the processors are further operable when executing the instructions to perform operations comprising:
receiving, from the content provider associated with the content item, a request to rank the content item for the user; and
receiving, from the content provider, context information associated the user;
wherein the generating of the third ranking score is further based on the context information associated with the user.

15. The system of claim 11, wherein the processors are further operable when executing the instructions to perform operations comprising:
accessing user data associated with the user;
wherein the generating of the first ranking score or the generating of the second ranking score is further based on the user data associated with the user.

16. One or more computer-readable non-transitory storage media embodying software that is operable when executed to cause one or more processors to perform operations comprising:

accessing a content item associated with a content provider, the content item having a plurality of attribute values corresponding to a plurality of attribute types;

accessing a first machine-learning model trained to process attribute values of known attribute types;

identifying that (1) a first set of attribute values in the plurality of attribute values corresponds to the known attribute types and (2) a second set of attribute values in the plurality of attribute values corresponds to custom attribute types different from the known attribute types, wherein the first machine-learning model is not trained to process attribute values of the custom attribute types, and wherein the second set of attribute values corresponding to the custom attribute types that are different from the known attribute types are to be clustered using a clustering model and resulting cluster representations are to be processed using a second machine-learning model;

generating, using the first machine-learning model, a first ranking score of the content item for a user based on the first set of attribute values;

clustering the second set of attribute values into a plurality of clusters using the clustering model, wherein the clustering model is configured to cluster attribute values based on similarities between the attribute values of the custom attribute types different from the known attribute types;

generating cluster representations of the second set of attribute values of the content item based on the plurality of clusters;

generating, using the second machine-learning model, a second ranking score of the content item for the user based on the cluster representations;

generating, using a third machine-learning model, a third ranking score of the content item for the user based on the first ranking score from the first machine-learning model and the second ranking score from the second machine-learning model; and selecting the content item for presentation to the user based on the third ranking score.

17. The media of claim 16, wherein the generating of the third ranking score is further based on metadata associated with the content provider.

18. The media of claim 17, wherein the metadata associated with the content provider comprises at least one of: a size of the content provider, a target outcome for presenting the content item to the user, or a target demographic of the user.

19. The media of claim 16, wherein the software is further operable when executed to cause the one or more processors to perform operations comprising:

receiving, from the content provider associated with the content item, a request to rank the content item for the user; and receiving, from the content provider, context information associated the user;

wherein the generating of the third ranking score is further based on the context information associated with the user.

20. The media of claim 16, wherein the software is further operable when executed to cause the one or more processors to perform operations comprising:

accessing user data associated with the user;

wherein the generating of the first ranking score or the generating of the second ranking score is further based on the user data associated with the user.

* * * * *